United States Patent
Mayer (10) Patent No.: US 11,833,958 B2
(45) Date of Patent: Dec. 5, 2023

(54) FLUSH MOUNT FOG POD AND METHOD OF ATTACHMENT

(71) Applicant: Wheel Pros, LLC, Greenwood Village, CO (US)

(72) Inventor: Cody Mayer, Atlanta, GA (US)

(73) Assignee: Wheel Pros LLC, Greenwood Village, CO (US)

( * ) Notice: Subject to any disclaimer, the term of this patent is extended or adjusted under 35 U.S.C. 154(b) by 0 days.

(21) Appl. No.: 17/977,896

(22) Filed: Oct. 31, 2022

(65) Prior Publication Data
US 2023/0135087 A1 May 4, 2023

Related U.S. Application Data

(60) Provisional application No. 63/274,188, filed on Nov. 1, 2021.

(51) Int. Cl.
*B60Q 1/068* (2006.01)
*B60Q 1/04* (2006.01)
*B60Q 1/20* (2006.01)

(52) U.S. Cl.
CPC ......... *B60Q 1/0683* (2013.01); *B60Q 1/0483* (2013.01); *B60Q 1/20* (2013.01)

(58) Field of Classification Search
CPC ....... B60Q 1/0683; B60Q 1/0483; B60Q 1/20
See application file for complete search history.

(56) References Cited

U.S. PATENT DOCUMENTS

| 4,639,840 | A | * | 1/1987 | McMahan | ............ | B60Q 1/0683 |
| | | | | | | 362/523 |
| D653,389 | S | | 1/2012 | Xu | | |
| 9,610,888 | B2 | | 4/2017 | Eboli | | |
| 10,207,628 | B1 | | 2/2019 | Salter | | |
| D883,562 | S | | 5/2020 | Hu | | |
| 10,647,279 | B1 | | 5/2020 | Ignarra | | |

FOREIGN PATENT DOCUMENTS

| CN | 204172760 U | 2/2015 |
| KR | 101992117 B1 | 6/2019 |
| KR | 101992616 B1 | 6/2019 |

* cited by examiner

*Primary Examiner* — Julie A Bannan
(74) *Attorney, Agent, or Firm* — Eric Hanscom (57) ABSTRACT

A flush mount fog pod is front-mounted through a hole in a vehicle or bumper frame. A bracket is inserted through the hole and turned 90 degrees for mounting to a bezel, which is attached to the front of the hole with bolts and nuts. A light pod is then snapped into the bracket. An adjustor bolt adjustably attaches to the back of the light pod through an access hole in the bezel and controls the tilt of the light pod by screwing and unscrewing the head of the adjustor bolt from the front of the light. A protective cover rotates over the head of the adjustor bolt when not in use to protect it from dirt and debris.

19 Claims, 7 Drawing Sheets

FLUSH MOUNT FOG POD AND METHOD OF ATTACHMENT

CROSS REFERENCE TO RELATED APPLICATIONS

This utility patent application claims priority back to U.S. Provisional Application No. 63/274,188, filed Nov. 1, 2021, the contents of which is incorporated by reference.

STATEMENT REGARDING FEDERALLY SPONSORED RESEARCH OR DEVELOPMENT

This invention was not federally sponsored.

FIELD OF THE INVENTION

This invention relates to the general field of automobile lights, and more specifically to a flush mounted light that can be installed without the need to work behind the frame of a car, and which can be adjusted from the front of the light.

BRIEF DESCRIPTION OF THE INVENTION

The invention is a fog light that can be mounted to the frame of a vehicle without the need to access the mounting hole from the rear. The device is front-mounted through a hole in a frame, utilizing a bracket that has been inserted through the hole and turned 90 degrees for mounting to a bezel, which is attached to the front of the hole with bolts. Once the bezel has been attached to the bracket, a hole remains in the middle of the bezel, that is custom designed for a light pod. The light pod is then snapped into the front of the bezel, all without requiring any access to the area behind the frame. The light is "front adjustable" in that it has an adjustor bolt that goes through an access hole in the bezel and threads into a threaded section of the bracket. This allows a user to control the tilt of the light pod by screwing and unscrewing the head of the adjustor bolt from the front of the light. A protective cover rotates over the head of the adjustor bolt when not in use to protect it from dirt and debris.

BACKGROUND OF THE PRODUCT

Fog lights are used for dearer visibility in low-light and other challenging conditions such as fog, smog, rain and snow. They are usually located below the vehicle s head lights and are mounted on bumpers. This gives the driver a better view of the road, and are commonly made in white, yellow, and blue. The global market for fog lights is nearly 4 billion dollars and growing at approximately 7% per year. Thus, an easily installed and adjusted fog light is a highly desirable product.

STATEMENT OF THE PROBLEM

Fog lights are mounted to a (mostly) flat surface by bolting the light bezel through four holes cut into the surface. The bolts use nuts on the back side, so rear access is required for installation. The light then points perpendicular to the surface—wherever that is (the sky, oncoming driver's eyes). An angled spacer is the only available aiming mechanism, but these only come in macro (15+ degree) increments, and customers must know up front what angle they need. Most OEM fog lights can be adjusted in the vertical plane. While the adjustment angle is not large, it is enough to account for the manufacturing tolerances of the vehicle. The problem is that they are always on the back side of the light where access is more limited. This adjustment style is not typically considered for a flush mount light where rear access is even more limited and space constraints are even tighter. Thus, there exists a need for an easily mountable fog light that can be attached and adjusted from the front.

The current invention provides just such a solution by having a flush-mounted fog pod that is mounted from the front, through a hole in a bumper or other part of a vehicle. A bracket is inserted through the hole and turned 90 degrees for mounting to a bezel, which is attached to the front of the hole with bolts. A light pod is then snapped into the bracket. An adjustor bolt adjustably attaches to the back of the light pod through an access hole in the bezel and controls the tilt of the light pod by screwing and unscrewing the head of the adjustor bolt from the front of the light into and out of a threaded section of the bracket. A protective cover rotates over the head of the adjustor bolt when not in use to protect it from dirt and debris.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
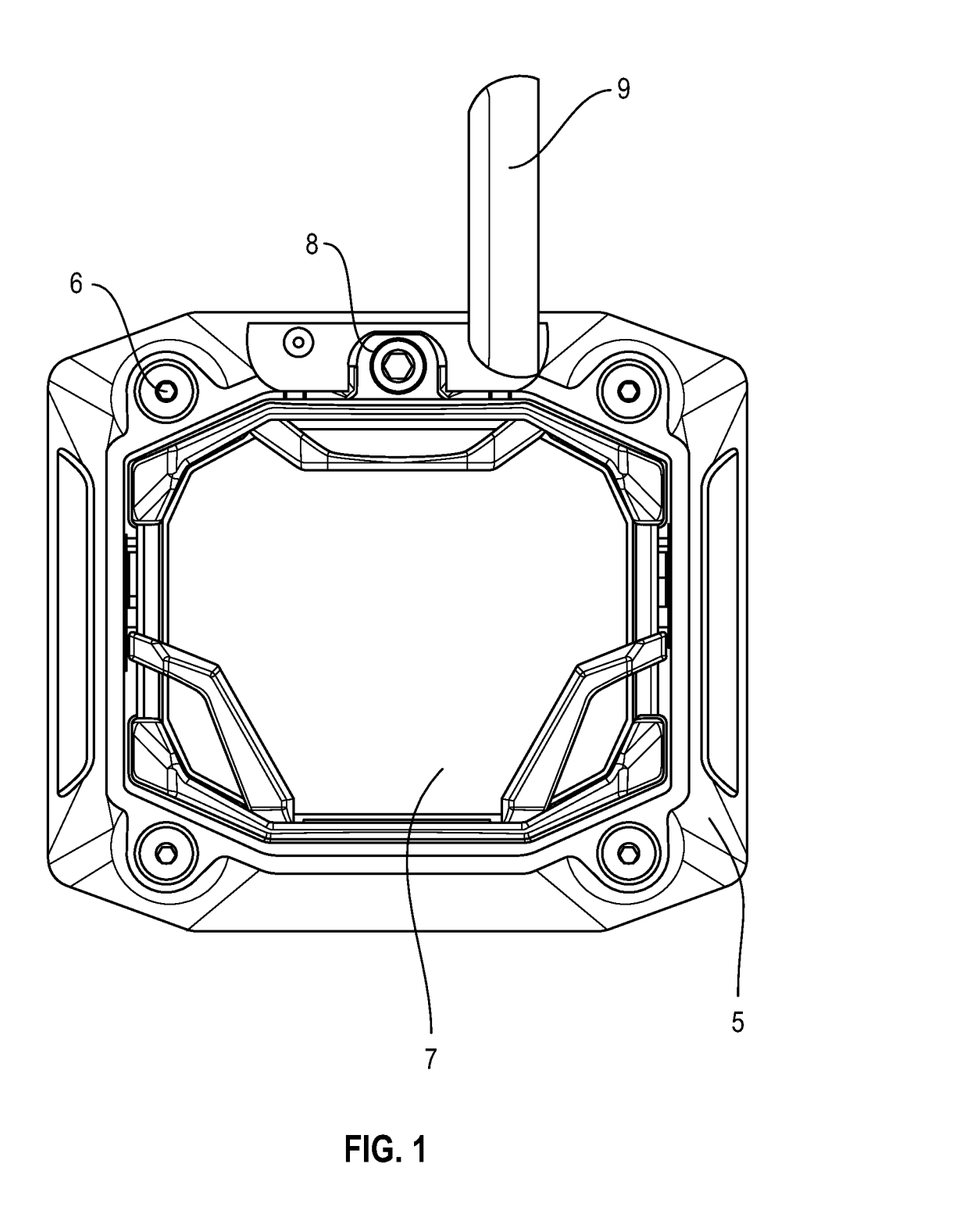
FIG. 1 is a front view of a light pod.

FIG. 1 is a front view of a light pod 7, inserted into a bezel 5. The light pod 7 is attached to the bezel 5 through, in this case, four bolts 6. The assembly also has an adjustor bolt 8 with threads that mate with a threaded socket in the bracket (not shown in this figure but illustrated in FIG. 3). This allows the angle of the light pod to be adjusted from the front of the vehicle frame, rather than forcing someone to access the back of the frame to change the angle. The screwing and unscrewing the bolt, a user can easily change the angle of the light pod—this is a significant improvement over the prior art which requires adjustments to be made from the back of the light pod, on the back side of the bumper. A protective cover 9, rotates over the adjustor bolt 8 after the desired angle of the light pod has been achieved. This not only protects the adjustor bolt from unintentional rotation, but also prevents dirt and other debris from entering the device and perhaps jamming the adjustment mechanism.

Figure 2:
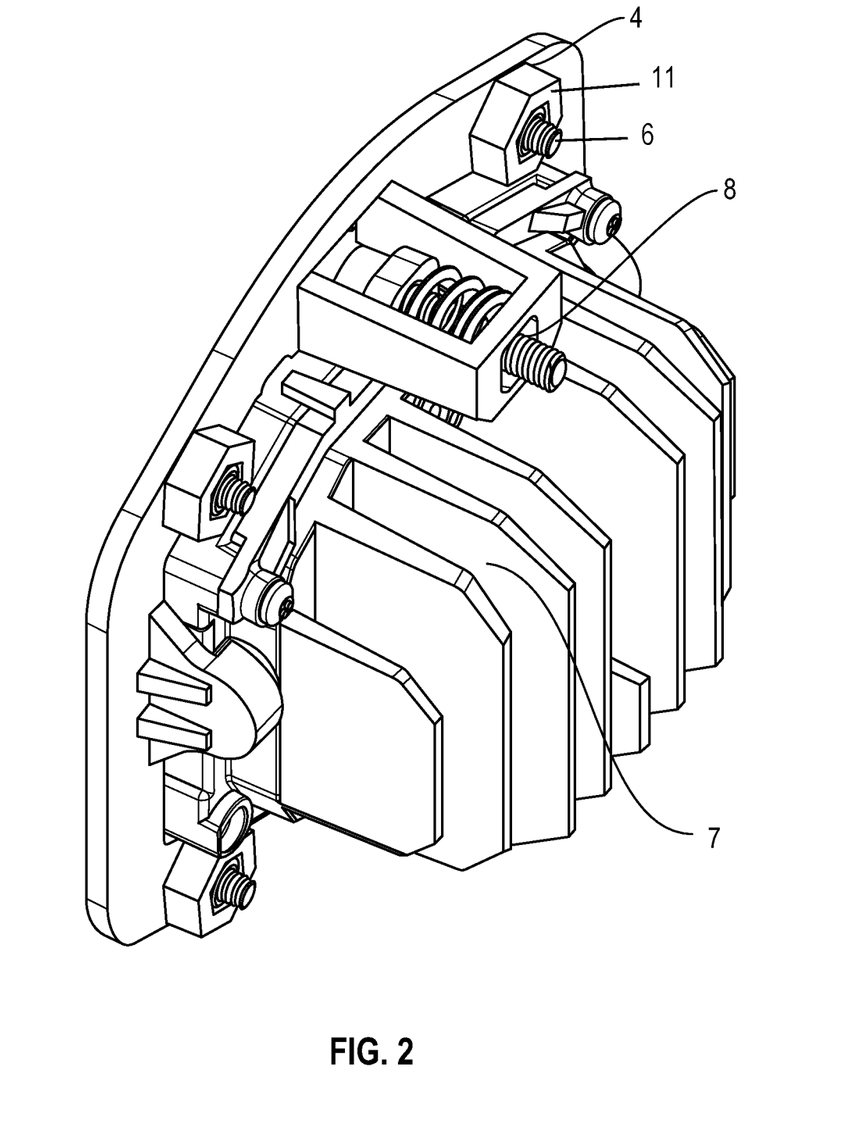
FIG. 2 is a back, perspective view of a light pod.

FIG. 2 is a back, perspective view of a light pod 7. The light pod in this illustration has already been inserted into, and attached to the bezel, which has been inserted into the bracket 4. The adjustor bolt 8 has been inserted into the threaded receptacle in the bracket 4. Bolts 6 have been inserted through the bezel from the front, and thread into nuts 11 to secure the bezel to the bracket. This figure illustrates how a user can rotate the adjustor bolt from the front of the light pod and adjust its angle as the threaded section of the adjustor bolt rotates in or out of the bracket.

Figure 3:
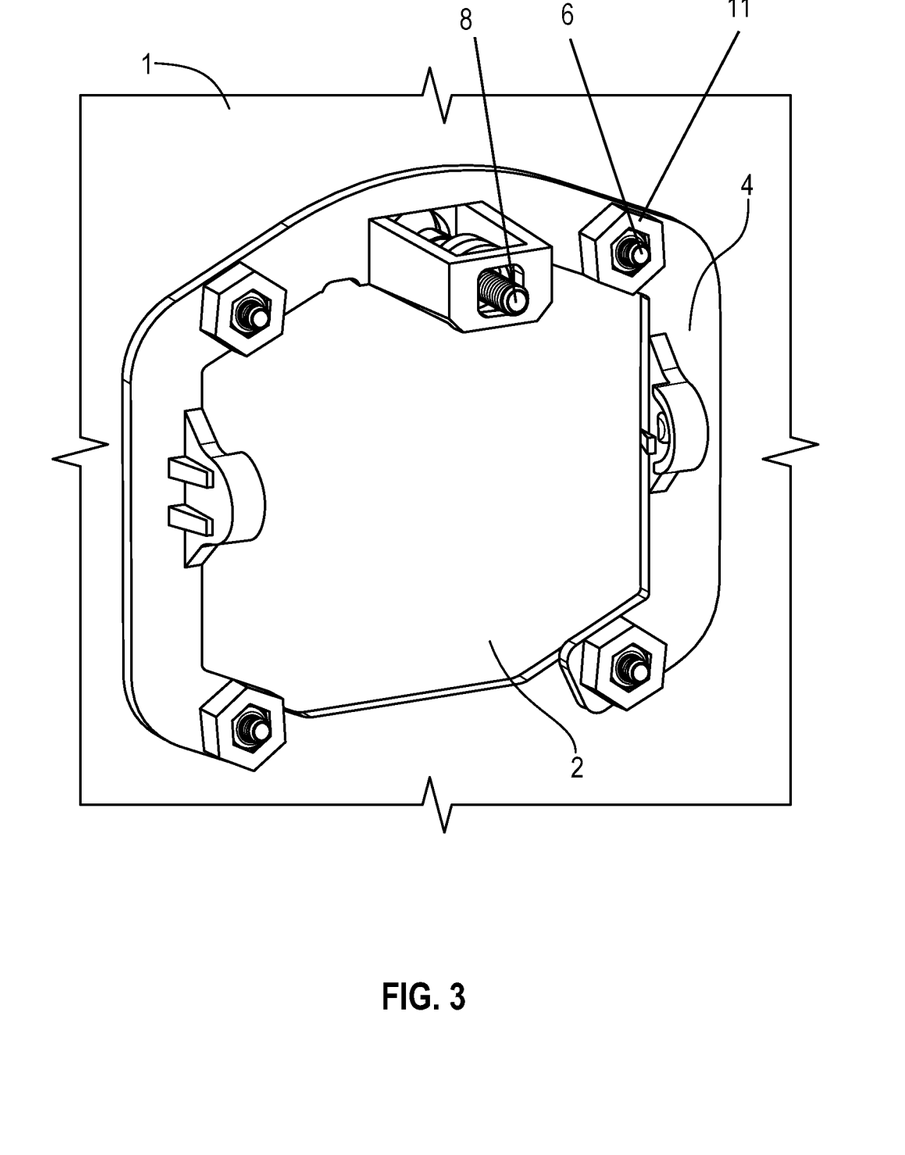
FIG. 3 is a back view of a bracket.

FIG. 3 is a back view of a bracket 4. In this figure, the bracket has been inserted into the light hole 2 and rotated such that bolts can secure it to the bezel (not shown in this figure). The attach the bracket, an installer need only insert the bracket and rotate it until the bolts 6 line up with threaded portions of the nuts 11. The bezel (not shown from this perspective) is attached on the front of the frame, with bolts 6 that secure the bezel to the bracket with nuts 11.

Figure 4:
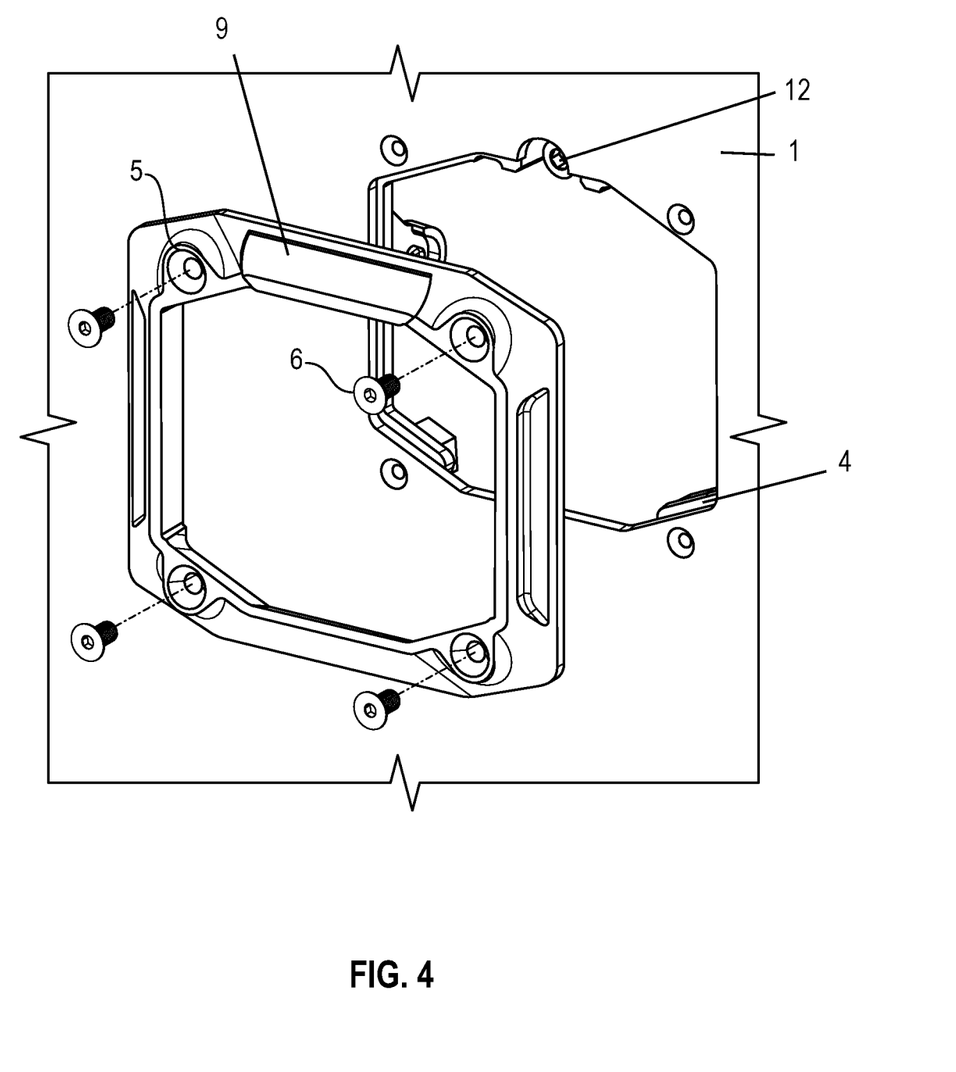
FIG. 4 is a perspective view of a bezel.

FIG. 4 is a perspective view of a bezel 5 ready to be attached to a bracket 4. The bracket has already been inserted into the light hole 2 in the frame 1, and rotated such that the bolts 6 can enter through holes in the bezel and engage with threaded sections of the nuts, thereby securing the bezel to the bracket. On the bracket 4, the threaded bracket section 12 awaits the insert of the adjustor bolt (8 in other figures). The protective cover 9 is in a closed position in this figure.

Figure 5:
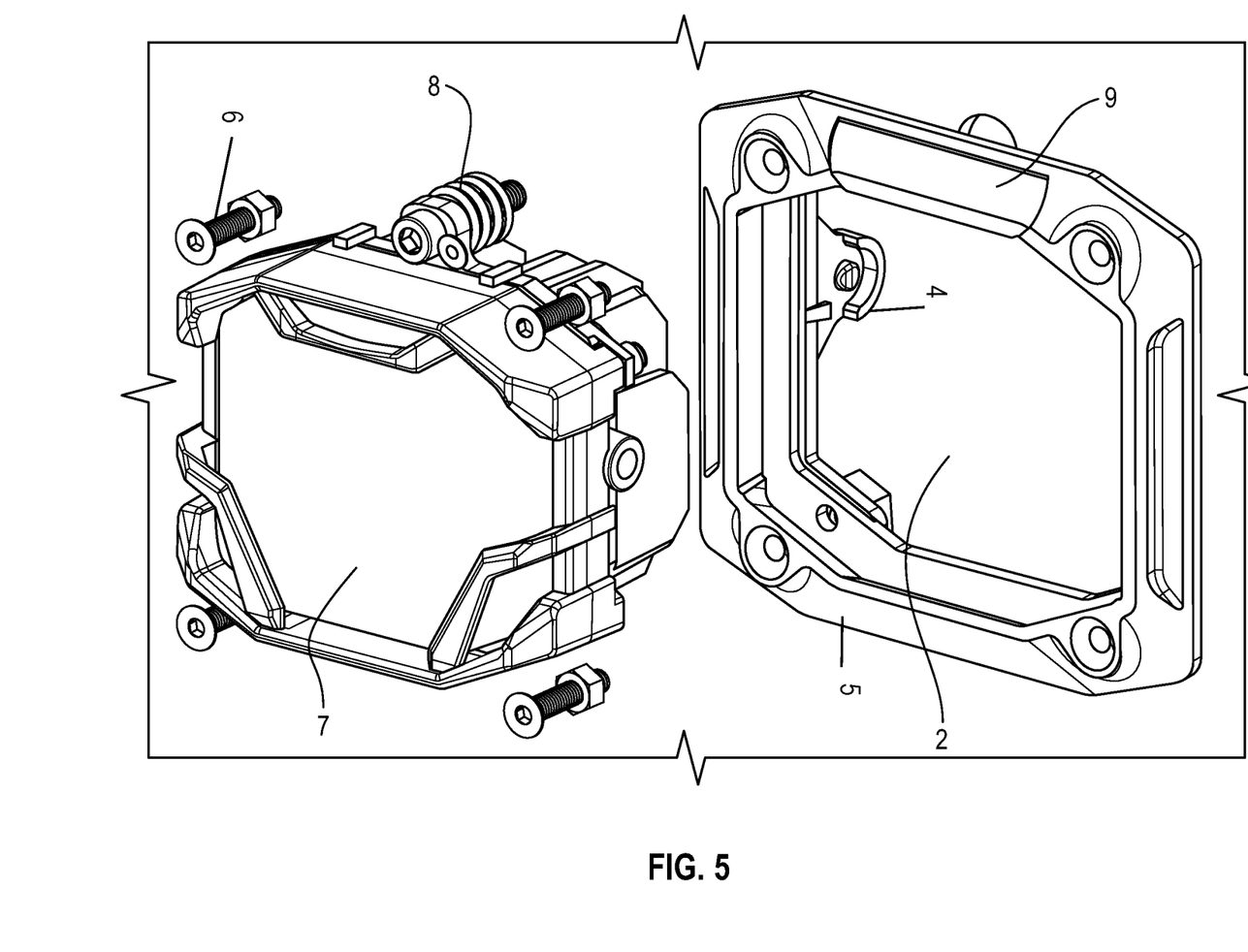
FIG. 5 is a perspective view a light pod unit ready to be attached to a bezel.

FIG. 5 is a perspective view a light pod unit ready to be attached to a bezel 5. The bezel 5 has already been with the bracket 4. Bolts 6 are ready to be inserted through aligned holes in both the bezel 5 and bracket 4, and will be secured with nuts. The light pod 7 will now be snapped into the bezel. The protective cover 9 in the bezel is about to be rotated, to allow the adjustor bolt 8 of the light pod to engage the threaded section in the bracket (12 in other figures).

Figure 6:
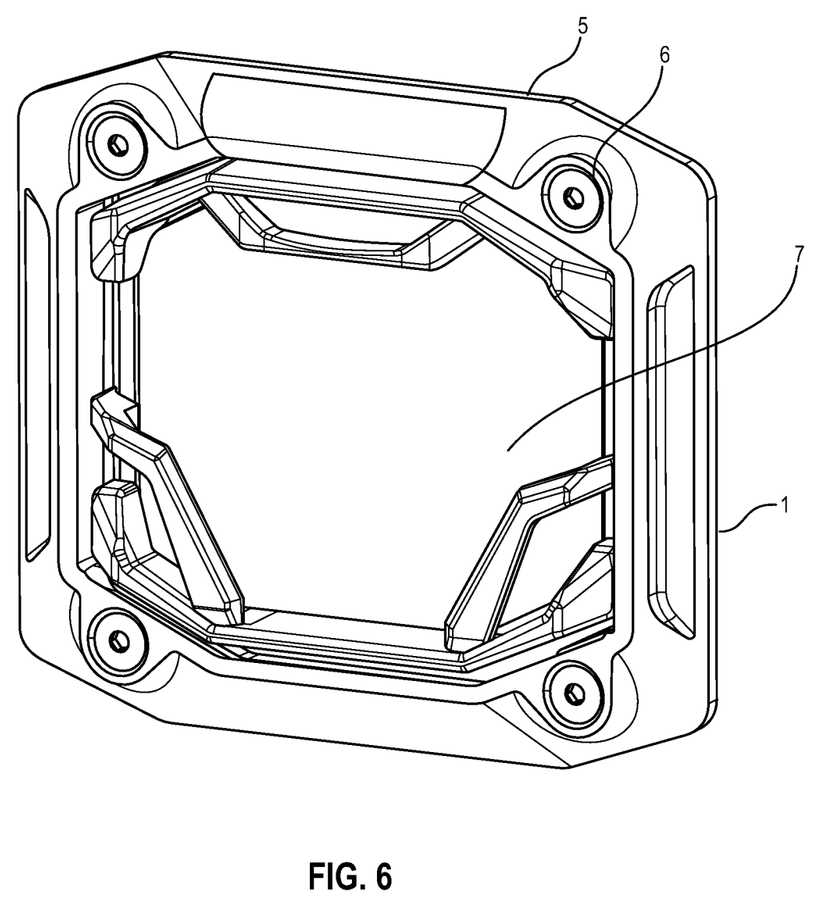
FIG. 6 is a perspective view of bezel/light pod assembly.

FIG. 6 is a perspective view of bezel/light pod assembly. The light pod 7 has been inserted into the bezel 5, that rests on the outer surface of the frame 1.

Figure 7:
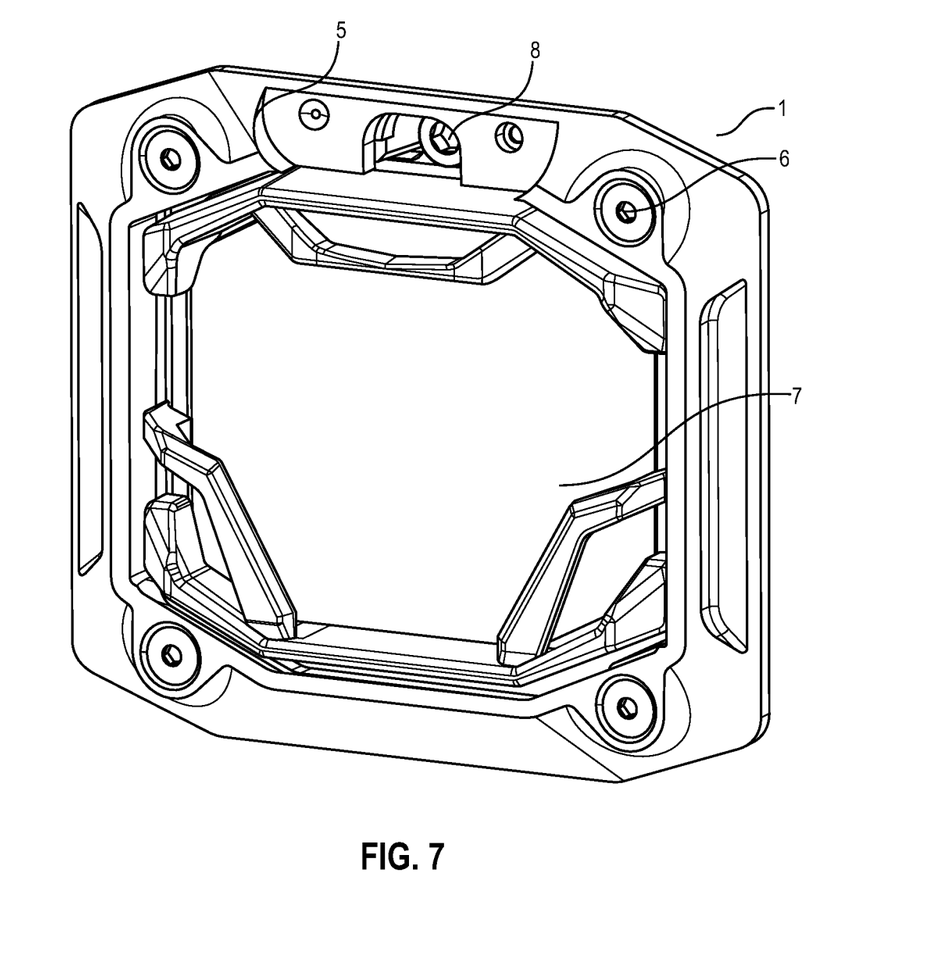
FIG. 7 is a perspective view of a bezel/light pod assembly.

FIG. 7 is a perspective view of a bezel/light pod assembly. In this embodiment, the protective cover has been removed for purposes of illustration. The adjustor bolt 8 has been inserted through the light pod and the bezel, where it has engaged with threaded section of the bracket (12 in other figures). This figure shows how easy it will be for a user to adjust the angle of the light pod from the front of the frame 1.

As can be seen from the previous figure descriptions, the key to this invention is that a light pod can be mounted to a frame without the need for the installer to access the mounting hole from the back of the frame. This not only saves time, but also minimizes the danger to the installer of having to position himself/herself under and behind the frame. As its basic design, a flush mount fog pod 7 is front-mounted through a hole 2 in a frame 1. The frame can be a vehicle bumper, the frame of a vehicle, or another sheet of material that can hold a light. A bracket 4 is inserted through the hole 2 and turned 90 degrees for mounting to a bezel 5 that is attached to the front of the hole with bolts 6 and nuts 11. A light pod 7 is then snapped into the bracket 4. An adjustor bolt 9 adjustably attaches to the back of the light pod through an access hole in the bezel and controls the tilt of the light pod 7 by screwing and unscrewing the head of the adjustor bolt 8 from the front of the light into a threaded section 12 of the bracket. A protective cover 9 rotates over the head of the adjustor bolt when not in use to protect it from dirt and debris.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention.

Many aspects of the invention can be better understood with references made to the drawings above. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

What I claim is:

1. A light, consisting of: a bracket, a bezel, two or more bolts, two or more nuts, a light pod, an adjustor bolt, and a protective cover, where the bracket is connected to the bezel by the two or more bolts and the two or more nuts, where the bracket and the bezel are located on opposite sides of a hole in a vehicle frame, where the light pod is snapped into a receiver in the bracket, where the adjustor bolt has a seat on the light and attaches at a threaded end to a threaded section in the bracket, where the light pod can be adjusted by screwing and unscrewing a head of the adjustor bolt, and where the protective cover rotates to cover and uncover the head of the adjustor bolt.

2. The light of claim 1, where the light is installable without an installer reaching behind the frame.

3. The light of claim 1, where the light is adjustable from the front of the front.

4. The light of claim 1, where the bracket and the bezel are located on opposite sides of the hole in the vehicle frame, where the light pod is snapped into the bracket, where the adjustor bolt has a seat on the light and attaches at a threaded end to a threaded section in the bracket, where the light pod can be adjusted by screwing and unscrewing a head of the adjustor bolt.

5. An assembly, comprising: a light pod, where the light pod has an adjustor bolt, and means to attach the light pod to a hole in a frame.

6. The assembly of claim 5, where the means to attach the light pod to the hole in the frame comprises a bezel and two or more bolts and two or more nuts.

7. The assembly of claim 5, where the means to attach the light pod to the hole in the frame comprises a bracket and two or more bolts and two or more nuts.

8. The assembly of claim 5, where the means of attachment comprises: a bracket, a bezel, two or more bolts, two or more nuts, a light pod, an adjustor bolt, and a protective cover, where the bracket is connected to the bezel by the two or more bolts and the two or more nuts, where the bracket and the bezel are located on opposite sides of a hole in a frame, where the light pod is snapped into a receiver in the bracket, where the adjustor bolt has a seat on the light and attaches at a threaded end to a threaded section in the bracket, where the light pod can be adjusted by screwing and unscrewing a head of the adjustor bolt.

9. The assembly of claim 8, where light pod and the bezel are manufactured as one unit and the means to attach the light pod to the hole in the frame comprises a bracket and two or more bolts and two or more nuts.

10. The assembly of claim 5, where the means of attachment comprises: a bracket, a bezel, two or more bolts and two or more nuts, a light pod, an adjustor bolt, and a protective cover, where the bracket is connected to the bezel by the two or more bolts, where the bracket and the bezel are located on opposite sides of a hole in a frame, where the light pod is snapped into the bracket, where the light pod is rotatable within the bracket, where the adjustor bolt has a seat on the light and attaches at a threaded end to a threaded section in the bracket, where an angle of the light pod can be adjusted by screwing and unscrewing a head of the adjustor bolt.

11. The assembly of claim 10, where the protective cover rotates to cover and uncover the head of the adjustor bolt.

12. The assembly of claim 10, where the protective cover snaps on and off to cover and uncover the head of the adjustor bolt.

13. A method of installing a light, comprising the steps of, first obtaining a light, where the light comprises a bracket, a bezel, two or more bolts and two or more nuts, a light pod, an adjustor bolt, and a protective cover, here the bracket is connected to the bezel by the two or more bolts and the two or more nuts, where the bracket and the bezel are located on opposite sides of a hole in a frame, second, snapping the light pod is snapped into a receiver in the bracket, where the light pod is rotatable within the receiver in the bracket, where the adjustor bolt has a seat on the light and attaches at a threaded end to a threaded section in the bracket, where the light pod can be adjusted by screwing and unscrewing a head of the adjustor bolt, and where the protective cover rotates to cover and uncover the head of the adjustor bolt.

14. The method of claim 13, where the method additionally comprises a second step of creating a hole in a frame, attaching the bracket to an inside surface of the frame, attaching the bezel to a front side of the frame, attaching the bezel to the bracket by the two or more bolts and the two or more nuts, where the two or more bolts pass through one or more bezel holes in the bezel and one or more bracket holes in the bracket.

15. The method of claim 14, additionally comprising the step of snapping the light pod into a receiver in the bracket and screwing the adjustor bolt into a threaded section of the bracket.

16. The method of claim 15, additionally comprising the step of adjusting an angle of the light pod by screwing and unscrewing a head of the adjustor bolt.

17. The method of claim 16, additionally comprising the step of rotating the protective cover over and off of the head of the adjustor bolt to prevent exposure to dirt during times when the adjustor bolt is not being adjusted.

18. The method of claim 13, where the means of attachment between the and bezel is one or more bolts and one or more nuts inserted from a front face of the bezel.

19. The method of claim 17, where the adjustor bolt has a seat on the light and attaches at a threaded end to a threaded section in the bracket, where the light pod can be adjusted by screwing and unscrewing a head of the adjustor bolt, and where the protective cover rotates to cover and uncover the head of the adjustor bolt.

\* \* \* \* \*